(12) United States Patent
Longhorn

(10) Patent No.: US 9,450,962 B2
(45) Date of Patent: Sep. 20, 2016

(54) SYSTEM AND METHOD FOR ACCESS CONTROL AND USAGE MONITORING

(75) Inventor: Andrew Longhorn, Alexandra Headland (AU)

(73) Assignee: Allow2PtyLtd (AU)

( * ) Notice: Subject to any disclaimer, the term of this patent is extended or adjusted under 35 U.S.C. 154(b) by 200 days.

(21) Appl. No.: 14/236,090

(22) PCT Filed: Jul. 30, 2012

(86) PCT No.: PCT/AU2012/000899
§ 371 (c)(1),
(2), (4) Date: Jan. 30, 2014

(87) PCT Pub. No.: WO2013/016764
PCT Pub. Date: Feb. 7, 2013

(65) Prior Publication Data
US 2014/0195678 A1 Jul. 10, 2014

(30) Foreign Application Priority Data
Aug. 1, 2011 (AU) ................. 2011903068

(51) Int. Cl.
*G06F 15/173* (2006.01)
*H04L 29/06* (2006.01)
*G06F 21/62* (2013.01)
*H04L 12/26* (2006.01)

(52) U.S. Cl.
CPC ........... *H04L 63/10* (2013.01); *G06F 21/6218* (2013.01); *H04L 43/50* (2013.01); *H04L 63/20* (2013.01); *G06F 2221/2101* (2013.01); *G06F 2221/2135* (2013.01); *G06F 2221/2137* (2013.01); *G06F 2221/2149* (2013.01)

(58) Field of Classification Search
CPC ............. G06Q 30/02; G06Q 30/0601; G06Q 30/0207; H04W 12/08; H04W 12/12; H04L 41/0893; H04L 12/14; H04L 63/20; H04L 12/1407; H04L 63/08; H04M 15/00; H04M 15/58; H04M 15/80; H04M 15/66; H04M 15/61; H04N 21/2541; H04N 21/2543; H04N 21/43615; H04N 21/44204; H04N 21/47202; H04N 21/8355; H04N 7/162; G06F 21/10; G11B 20/00086; G11B 20/00768; G11B 20/00884
See application file for complete search history.

(56) References Cited

U.S. PATENT DOCUMENTS

| | | | |
|---|---|---|---|
| 2005/0240959 A1* | 10/2005 | Kuhn | H04N 7/163 725/25 |
| 2013/0017806 A1* | 1/2013 | Sprigg | H04M 1/66 455/411 |

*Primary Examiner* — Peling Shaw
(74) *Attorney, Agent, or Firm* — Dureska & Moore, LLC; David P. Dureska; Greg Strugalski

(57) ABSTRACT

A system (100) for providing access control and usage monitoring of a plurality of electronic devices or applications (110*a-h*) enables efficient access control. The system (100) includes a control server (105) having: a reception interface, for receiving usage information relating to an account and a request to use the account, wherein each request includes an account identifier, and the account is associated with one or more of the plurality of electronic devices or applications (110*a-h*) and at least one user; a data store, including a first set of usage rules for the account and a second set of usage rules for a second account; a processor and memory including program code, for: determining, using the rules stored on the data store associated with the account identifier in combination with the usage information, an outcome of the request; and a transmission interface, for communicating the outcome of the request, wherein the outcome is for controlling access to one or more of the plurality of electronic devices or applications (110*a-h*) by the at least one user.

13 Claims, 9 Drawing Sheets

SYSTEM AND METHOD FOR ACCESS CONTROL AND USAGE MONITORING

CROSS-REFERENCE TO RELATED APPLICATIONS

This application claims the benefit of PCT Application Serial No. PCT/AU2012/000899 Jul. 30, 2012, and Australian Patent Application Serial No. 2011903068, filed Aug. 1, 2011.

FIELD OF THE INVENTION

The present invention relates to access control and usage monitoring. In particular, although not exclusively, the invention relates to centralised access control and usage monitoring of a plurality of electronic devices.

BACKGROUND TO THE INVENTION

Various access control systems for devices are presently available, often marketed as parental control systems. Access control systems of the prior art include an interface, often as part of a menu system, of a device that is to be controlled. Devices of the prior art including access control systems include televisions, internet routers and gaming devices. Access control systems of the prior art often use a personal identification number (PIN) as access control means.

A disadvantage of access control systems of the prior art is that there is no synchronization between devices. A plurality of similar devices must be configured separately, and usage of such devices is measured separately. Access control systems of the prior art, in other words, generally are not used to set total limits for a plurality of devices.

A second disadvantage of access control systems of the prior art is that modification of the access control is typically similar to reconfiguring the access control system. This is particularly burdensome, for example, when a child is sick for a day or during school holidays and the default access control settings need to be modified.

A third disadvantage of access control systems of the prior art is that the access control systems are generally 'all or nothing'. For example, blocking internet access for a user will typically also block internet based applications such as backup or system update applications.

OBJECT OF THE INVENTION

It is an object of some embodiments of the present invention to provide consumers with improvements and advantages over the above described prior art, and/or overcome and alleviate one or more of the above described disadvantages of the prior art, and/or provide a useful commercial choice.

SUMMARY OF THE INVENTION

According to one aspect, the invention resides in a system for providing access control and usage monitoring of a plurality of electronic devices or applications, including:
a control server including:
a reception interface, for receiving usage information relating to an account and a request to use the account, wherein each request includes an account identifier, and the account is associated with one or more of the plurality of electronic devices or applications and at least one user;
a data store, including a first set of usage rules for the account and a second set of usage rules for a second account;
a processor and memory including program code, for:
determining, using the rules stored on the data store associated with the account identifier in combination with the usage information, an outcome of the request; and
a transmission interface, for communicating the outcome of the request, wherein the outcome is for controlling access to one or more of the plurality of electronic devices or applications by the at least one user.

Preferably, the rules include at least one of a time of day based restriction, a time based limit and a resource based limit.

Preferably, the rules include at least one rule that applies to more than one of the plurality of devices.

Preferably, the account identifier comprises a combination of a user identifier, identifying a user of one or more of the plurality of electronic devices or applications, and a device identifier, identifying one or more of the plurality of electronic devices or applications.

Preferably, the plurality of electronic devices or applications include at least one of a television, a personal computer, a printer, a router, a games console, a telephone, a micro-blogging application, and a social networking application.

Preferably, the rules include a plurality of rules applicable to the account identifier, wherein each rule is individually assessed.

Preferably, the rules include total usage bans for an account.

Preferably, the control server includes a reporting module that generates a report including usage statistics.

Preferably, the rules include day types.

Preferably, the day types include at least one of a weekday, a weekend, a school day, a school night, a school holiday, a public holiday and a sick day.

Preferably, the control server includes an administration interface, which enables addition or deletion of rules and setting of day types.

Preferably, the rules may be modified through tokens, where tokens may be redeemed for a change in a rule.

Preferably, the change in the rule is adapted to encourage usage of a first device over usage of a second device.

Preferably, the system comprises an online shop for redeeming vouchers or tokens.

According to another aspect, the invention resides in a method of providing access control and usage monitoring of a plurality of electronic devices or applications by a centralized server, including:
receiving usage information relating to an account, wherein the account is associated with one or more of the plurality of electronic devices or applications and one or more users;
receiving a request to use of the account;
determining, using rules stored on a data store and the usage information, an outcome of the request, wherein the rules include time or resource based restricted access to the account; and
sending a notification of the outcome of the request to the one or more electronic devices or applications.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

Figure 1:
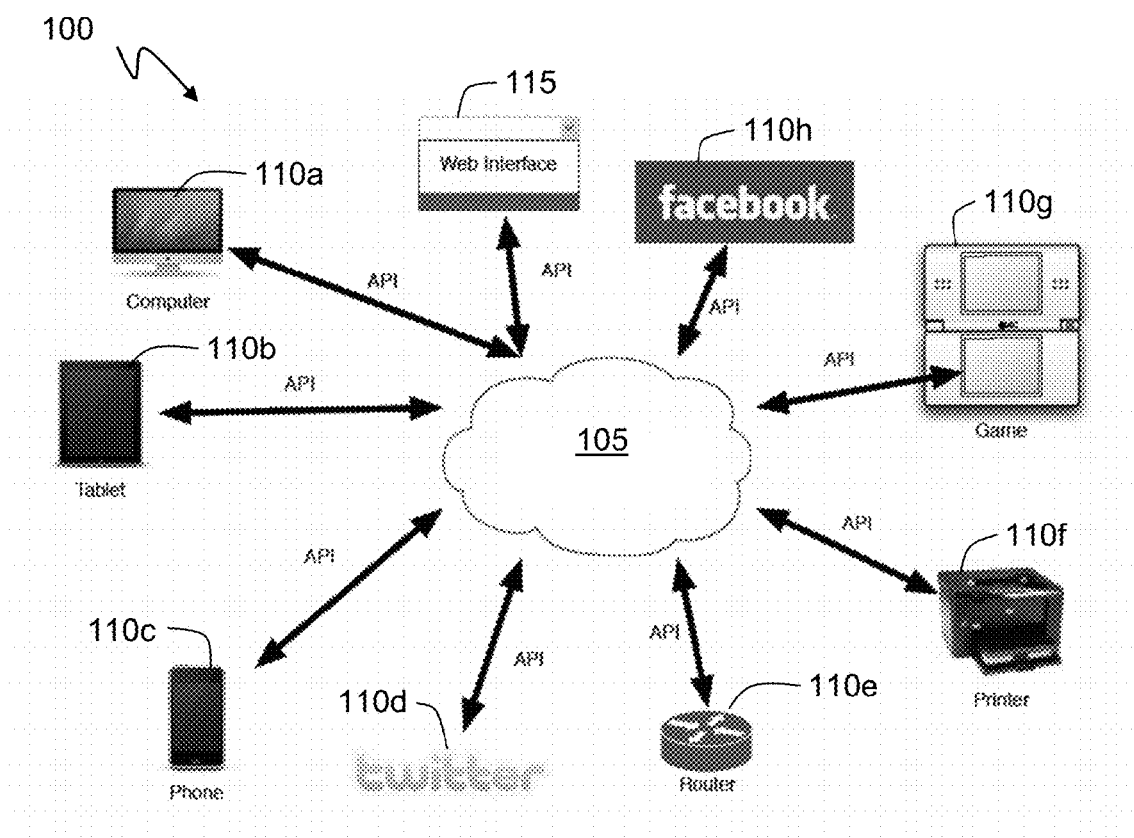
FIG. 1 diagrammatically illustrates an access control system including a plurality of devices, according to an embodiment of the present invention.

Those skilled in the art will appreciate that minor deviations from the layout of components as illustrated in the drawings will not detract from the proper functioning of the disclosed embodiments of the present invention.

DETAILED DESCRIPTION OF THE INVENTION

Embodiments of the present, invention comprise access control and usage monitoring systems and methods. Elements of the invention are illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

According to one aspect, the invention resides in a system for providing access control and usage monitoring of a plurality of electronic devices, including: a control server including: a reception interface, for receiving usage information relating to an account and a request to use the account, wherein each request includes an account identifier and the account is associated with one or more of the plurality of electronic devices; a data store, including a first set of usage rules for the account and a second set of usage rules for a second account; a processor and memory including program code, for: determining, using the rules stored on the data store associated with the account identifier in combination with the usage information, an outcome of the request; and a transmission interface, for communicating the outcome of the request, wherein the outcome is for one or more of the plurality of electronic devices to control access to the account.

Advantages of some embodiments of the present invention include an ability to efficiently provide access control to a plurality of devices and/or applications. By applying rules and usage information across the plurality of devices and/or applications, convenient and centralised control, such as by parents, can be achieved. According to some embodiments, rules can be easily structured to achieve usage rewards, incentives, or punishments associated with chores or other daily activities.

FIG. 1 diagrammatically illustrates an access control system 100 including a plurality of devices and applications.

The access control system 100 includes a centralized access control server 105 and a plurality of devices and applications 110a-h. The plurality of devices and applications 110a-h may include a computer 110a, a tablet 110b, a telephone 110c, a micro blogging application 110d, a router 110e, a printer 110f, a gaming device 110g, and a social network application 110h.

An Application Programming Interface (API) is used to configure each device and application 110a-h by the access control server 105.

The access control system 100 additionally includes a web interface 115 which may be used to configure the centralized access control server 105.

As is understood by a person skilled in the art, not all the devices and applications 110a-h of FIG. 1 need be present in a real system, and a system may include multiple devices or applications 110a-h of a single type. For example, the access control system 100 may be used to control a plurality of computers 110a.

Similarly, the access control system may be used with other types of applications including access to a bank account, a debit or credit card, or any other type of application that may be associated with an electronic device in some manner.

The system enables children, for example, to use a credit or debit card instead of cash. A parent then may be able to control a total amount of money spent, or an amount of money spent on particular categories of products and services, such as movies, junk food, cosmetics and the like, by controlling a bank account through a banking application.

The centralized access control server 105 may be located, for example, in a home, an office, a school, at a third party location or run using a cloud based architecture.

The centralized access control server 105 includes a reception interface, for receiving both usage information relating to a user account and requests to use the user account. The user account may comprise a user identifier and device combination, an account identifier for an external application, or an access control account used on multiple devices, for example. The applications are associated with one or more of the plurality of electronic devices, either directly or indirectly. For example, a social networking application may be associated with all devices having computer access and a browser.

The centralized access control server 105 typically includes a moderator account and a plurality of user accounts. The moderator account is used to control access to devices through the plurality of user accounts. The moderator account may create user accounts, or invite users to join, for example. The system may comprise multiple moderator accounts.

The system may comprise a combination of administration accounts and moderator accounts. An administration account may be provided to a teacher or other trusted third party, in other to allow the trusted third party to help administer a user account. For example, an administration account may recommend a reward or punishment, but a moderator account may approve or deny the recommended reward or punishment.

Additionally, a moderator or administration account may, for example, also be a user account. For example, an older child may be able to help a parent administer a younger child's account, while at the same time being moderated by the parent. In this case, the older child's account is both a user account and an administration account.

A user identifier may comprise, for example, a personal identification number, a username and password, a smart card or similar device, or any other type of identifications means. A user identifier may have global scope, for example through an email address, or have a local scope limited to an access control network, such as where a user identifier is a personal identification number.

Accounts, including user accounts, moderator accounts and administration accounts, of the centralized access control server 105 are advantageously associated with an email address or other type of communications means. The user identifier may include, for example, an email address, phone number or other type of communications address. Associating an account with a communications address enables the system to send information to the moderators or users, relating to their accounts. Accounts may be associated with an email address or other communications means at any time. For example, a young child may initially have a user account without an email address. Later, when the child gets older, an email address may be added to the child's user account.

The centralized access control server 105 and the plurality of devices and applications 110a-h are advantageously paired. Pairing is a process that links a device or application 110a-h to the centralized access control server 105, and is typically performed a single time—either on initialisation of the system or when a new device is purchased. For any device or application 110a-h to correctly apply access control, it must first be paired with the centralized access control server 105.

Each device or application 110a-h may have its own legacy access control system, but when a device or application 110a-h is paired with the centralized access control server 105 the device or application 110a-h should ignore any legacy control settings and instead use settings of the centralised access control server 105.

Pairing may be performed on devices that are used by a group of people where access to the devices is controlled by a single moderator account. Examples of such devices include a family computer, such as the device 110a, or a television.

In order to pair a shared device, such as the game device 110g, a moderator may access the access controls of the device 110g through its manufacturer supplied interface and enter an identifier associated with the device and the centralized access control server 105. Alternatively, a device identifier may be created one on the spot over a suitable interface. The device 110g then contacts the centralized access control server 105 and authenticates the pairing request. If authenticated, the device 110g is added to the system 100 and part of a paired key or other suitable authentication means is shared with the device 110g.

After pairing, a device may periodically reconnect in order to check limits for the device identifier using the authentication means.

Alternatively, per-user pairing can be performed on devices or applications 110a-h shared by many users. Examples of such devices or applications 110a-h include social networking applications and school devices which are used by multiple students. Thus devices can be variously controlled by multiple accounts, regarding for example various cloud based services such as those defined by the registered trademarks Facebook, Twitter, iCloud, Club Penguin, Dropbox, and Skype.

Upon creation of a user account, a user may additionally enter a moderator account identifier. The moderator account identifier is used to identify and access the centralized access control server 105, to which a request is sent. The centralized access control server 105 sends a request to a moderator which may accept or rejects the request. If accepted, the pairing is considered complete and the service is controlled by the centralized access control server 105.

An application provider or device manufacturer may decide that only partial or no access to the application or device is allowed until the moderator has accepted the pairing.

Once a device is paired, it appears in a device list screen of the centralized access control server 105.

A user may send a request to a moderator, as described above, or get 'invited' by a moderator to create a user account. An invitation from a moderator may include, for example, creation of a user account on a new device.

The centralized access control server 105 includes a data store, including usage rules for user accounts. The usage rules include at least a first set of usage rules for a first user account and a second set of usage rules for a second user account.

The centralized access control server 105 determines, using the rules stored on the data store associated with the relevant user account identifier in combination with the usage information, whether further usage should be granted or denied. This outcome is communicated to the user through one or more devices or applications 110a-h.

A device or application 110a-h may allow access to the device or application 110a-h, by a user, without a connection to the control server 105. This may be based on last known available remaining time, and last known bans, for example. The device or application 110a-h, or an entity between the device or application 110a-h and the control server 105, may store requests for later reporting.

When a connection with the control server 105 is available, the device or application 110a-h may then report usage relating to the request to the server. The device or application 110a-h may report the usage in a similar way to the request described above, but with a flag or similar signalling mechanism in order to indicate that the time has already been used. This is advantageous as a server should not deny a request for time that has already been allocated and used, even if insufficient time is available for an account. That will enable an account to go into 'debt' if a user uses more time than allocated when a device or application 110a-h is not connected to the control server 105. Any further time allocated to the account will then first be applied to reducing such debt.

A transmission interface of the control server 105 is used for communicating the outcome of the request. The outcome is for one or more of the plurality of electronic devices or applications to control access to the user account. The outcome may be sent directly to one or more of the plurality of electronic devices. Alternatively, the outcome may be sent to a server which indirectly controls the plurality of electronic devices or applications through a user account. For example, an outcome may be sent to a social network application server, which in turn grants or denies access to a user account.

Figure 2:
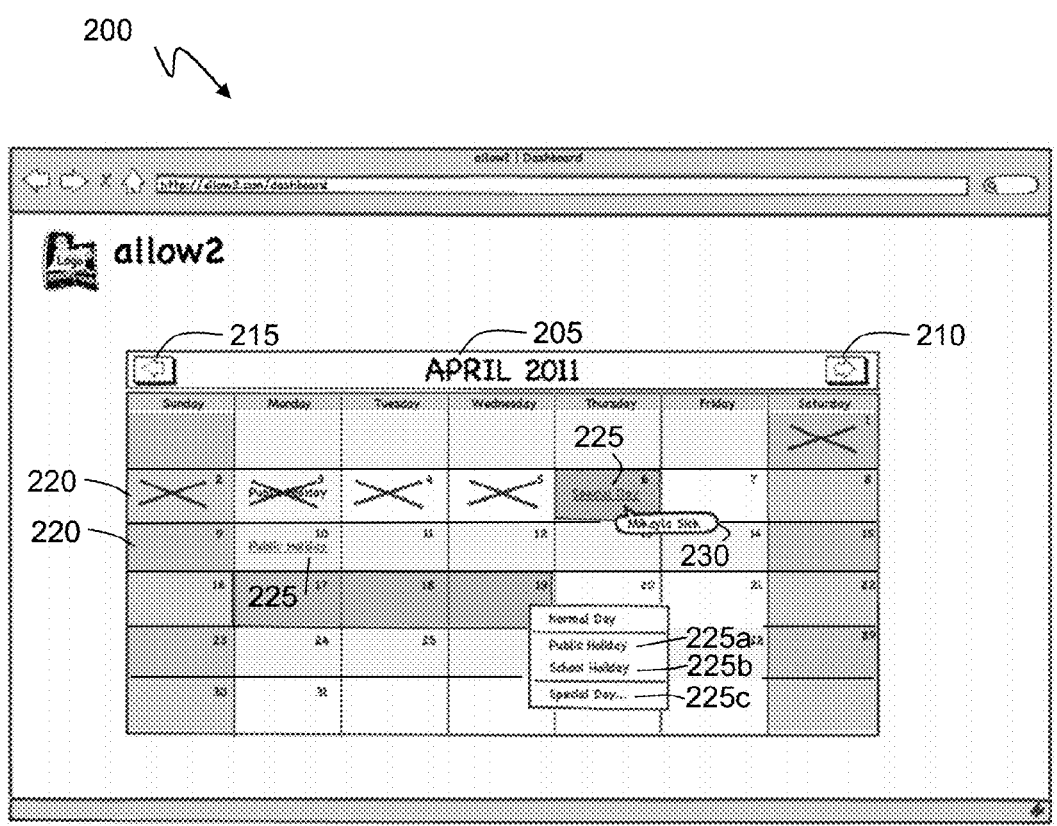
FIG. 2 illustrates a calendar component of the access control system of FIG. 1.

FIG. 2 illustrates a calendar 200 of the access control system 100.

The calendar 200 is a Gregorian calendar, and includes date information relating to the month and year 205 that is being displayed. The calendar 200 includes navigation buttons 210, 215 that allow for month by month navigation forwards and backwards in time, respectively. The calendar 200 is arranged in a table arranged according to day of the week. As is understood by a person skilled in the art, any other suitable calendar or date presentation means may be used without departing from the invention.

Each day, shown as a cell 220 in the calendar 200, may be given a day category 225. Day categories 225 may include public holiday 225a, school holiday 225b, or special day 225c, for example. A special day 225c is a day which may be configured additionally, such as a sick day for a specific person. Normal days, i.e. days without a particular day category, are shown without marking. Day categories 225 may however include default day types such as work day, school day, weekend, and all days may be shown as having a day category 225.

A popup information balloon 230 may be used to provide extra information about day configuration. For example, a special day 225c may include extra information in the popup information balloon 230 indicating that a person is sick, including details of that person. A special day 225c may apply to a single person only or to a group of people. For example, a public holiday may be applied to all people, wherein a sick day may be applied only to one person who is sick.

Each day may be associated with default day types. For example, Monday to Friday may be associated with school days, and Saturday and Sunday with days off. The default day type may then be modified when needed, such as when a person is sick or on school holidays.

Figure 3:
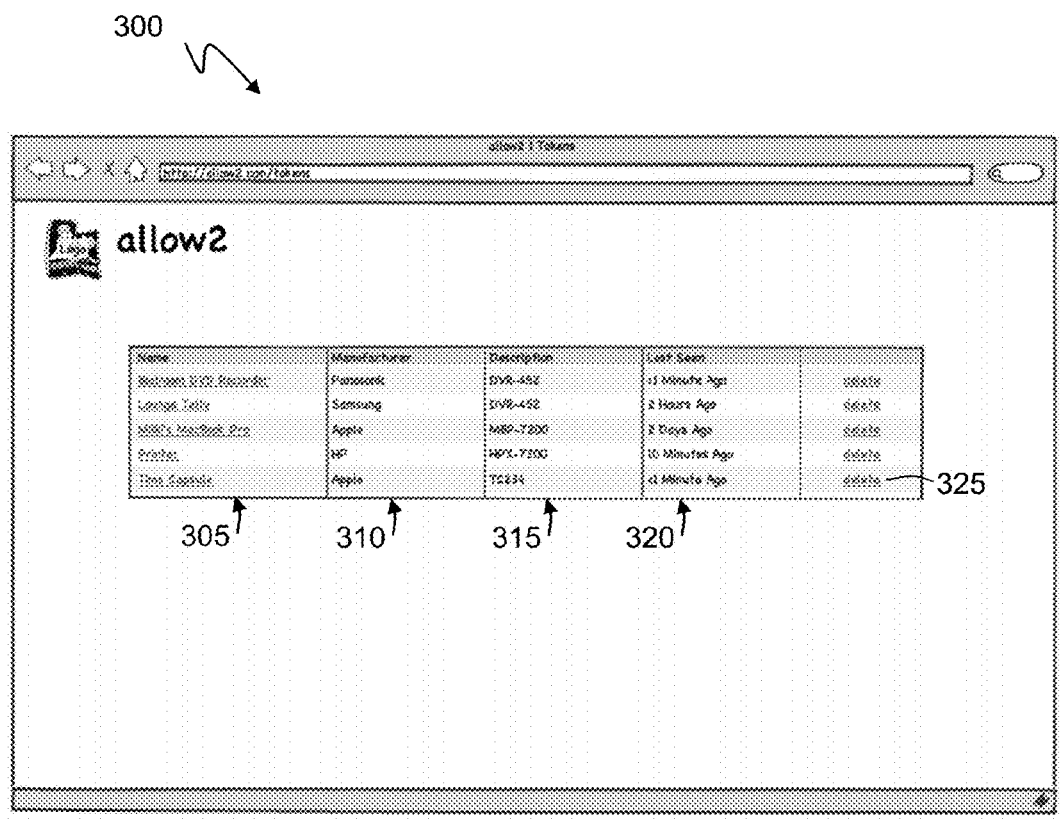
FIG. 3 illustrates a device list of the access control system of FIG. 1.

FIG. 3 illustrates a device list 300 of the access control system 100. The device list 300 identifies devices and applications, such as devices or applications 110a-h, that have been paired with the control server 105.

The device list 300 includes a name 305 of the device, a manufacturer 310 of the device, a description 315 of the device, and information relating to when the device was last used or last paired 320 with the access control system 100. The device list 300 may include a delete button 325 for each device, which may be used to remove a device from control of the system 100. As is understood by a person skilled in the art, other information and buttons may be present, including an add device button, and not all of the information shown in FIG. 3 need be present.

The name 305 of a device may double as an access control configuration button. This enables access control of a device to be configured. As is understood by a person skilled in the art, devices may be configured as groups, for example televisions, or internet access may be controlled together for a plurality of devices. According to some embodiments, the control server 105 can also provide a "directory" that lists compatible products that have incorporated the services of the present invention, such as in the same way the App Store of Apple Computer, Inc. lists all apps that are usable on iPhones (Registered Trademark).

Figure 4:
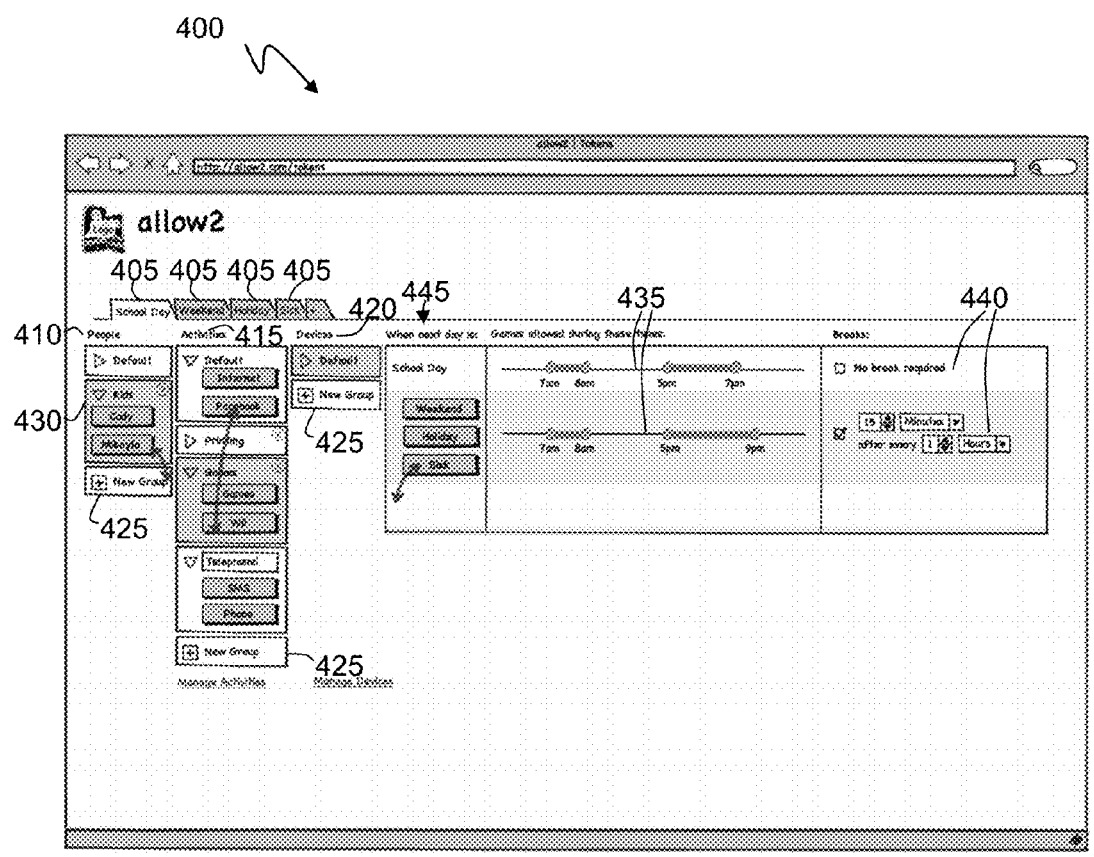
FIG. 4 illustrates a rules generation page of the access control system of FIG. 1.

FIG. 4 illustrates a rules generation page 400 of the access control system 100 of FIG. 1.

The rules generation page 400 includes a plurality of day category tabs 405, which are used to specify when a rule is valid. The rules generation page 400 includes menus to select users 410 to which a rule is valid, the activity 415 to which a rule applies, and the devices 420 to which a rule applies.

As is understood by a person skilled in the art, the users 410, activity 415 and device 420 selection menus may include group creation 425 and group selection 430 functionality. This allows for a rule to be applied to multiple people, on multiple devices or for multiple activities.

Users may be 'drag and dropped' to create a new group of users. Rules for the new group may be blank, and thus need to be added, or rules from one or more existing groups may be imported. If a user is dragged to an existing group, the rules of the existing group apply for the user. As is understood by a person skilled in the art, the above mentioned default application of rules are simply examples, and the default rule settings may be changed at any time.

The rules generation page 400 includes a timeline 435 which may be used to specify when a rule is valid. The timeline 435 specifies when usage of a device is allowed, but as is understood by a person skilled in the art, the timeline 435 may also specify when usage of a device is forbidden. The rules generation page 400 includes a break specification 440 which may specify if and how often breaks are required during use of a device.

The rules generation page 400 additionally includes functionality to specify timelines 435 and break specifications dependant on the category of the following day 445.

Rules may take any suitable form, but are typically implemented through limits. A limit may apply to many devices, such as total internet time allowed, or could be very specific to a device or application, such as a total number of social network postings allowed. According to some embodiments, users may also specify extensions on an ad hoc basis. For example, additional allowance and/or additional time periods can be provided on an ad hoc basis (e.g., 30 minutes extra time now, or 5 additional printouts this afternoon).

As is understood by a person skilled in the art, limits need not be time specific, and may include limits such as total expenditure for a bank account, or category specific such as total expenditure for a product or service category such as entertainment, food, etc.

The rules generation page 400 shows time limits for the selected day category tab 405. The limits show the times during which an activity is allowed, but the allowed times may vary for a day category depending on the day category of the following day. For example, a child may be allowed to watch television later on an evening if the following day is a holiday or weekend.

Rules may be additionally enhanced through tokens. Tokens may be issued as part of an allowance, or as a type reward. According to one embodiment, tokens may be redeemed for time on devices, wherein the time redeemable is adapted to encourage a certain type of use. For example, a token may be redeemed for 15 minutes of television, or 30 minutes of educational gaming, thus encouraging educational gaming over television.

According to some embodiments, an online "shop" is integrated into the access control system 100, where the shop allows parents or guardians, for example, to set up their own rewards catalogue from which their kids can choose items on which to spend tokens. For example, the catalogue items can be of three types:

a) Vouchers for specific prizes. For example a parent may simply go out and purchase a catalogue item for which an appropriate number of vouchers has been redeemed, or a prize may be for an extra piece of cake, or an hour to play with dad;

b) Additional privileges (such as extra time or allowance, or later use of restricted services); and c) Real products from other vendors (such as a book or game from an online store such as Amazon.com). In this case the platform may act as an agent for the vendor and process a transaction automatically based on the child selecting a product.

Figure 5:
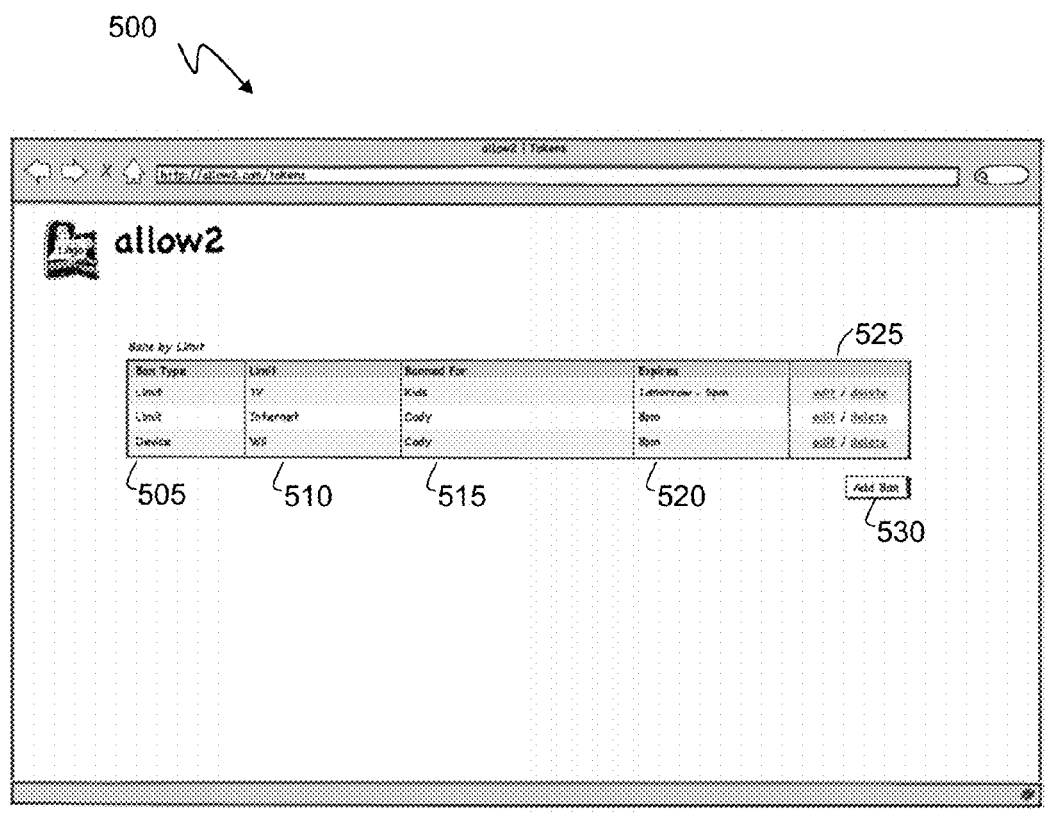
FIG. 5 illustrates a bans page of the access control system of FIG. 1.

FIG. 5 diagrammatically illustrates a bans page 500 of the access control system 100.

Bans are similar to rules in that they specify a time during which a device or group of devices may not be used. Bans are however used together with regular rules, such that when a ban expires, the regular rules come into action again.

The ban page 500 includes a ban type 505, a limit 510, a user list 515 and an expiry setting 520. Ban type 505 may include a limit of a feature present in multiple devices, or a device limit. Examples of feature limits 510 include TV or Internet usage, and a device limit 510 limits access to a specific device that is specified in the limit 510.

The user list 515 includes the users or the group of users to which a ban applies. The expiry 520 includes the date and time when the ban expires. Upon expiry of a ban, any previous rules for the device and user applies.

Bans of the present invention can be programmed to lapse after a specified period of time, e.g. no internet for 3 hours, at a certain time, e.g. no internet until 5 pm, Monday 23 Mar. 2011, or until one or more criteria are met. Such criteria may comprise tasks such as have a shower, dress for school, have breakfast, put dishes in dishwasher, make lunch and pack bag. The completion of such criteria is advantageously updated by a moderator, for example a parent.

Bans can be created "on the fly" in response to a bad behaviour, or pre-created as a list to quickly select from. Bans may be programmed to auto apply at certain times of certain days, such as a 'get ready for school' style ban which would ban all use of all devices until a child is ready for school.

Bans may be presented to a user as a checklist, displaying what is necessary for the user to lift the ban. Once all items are completed, a request may be posted to a moderator in order to approve the ban being lifted. Additionally, users may be trusted to self administer bans, checking off items themselves. Further, bans may be designed to always allow designated exceptions, such as the ability to always call emergency services, e.g. dialing 000 or 911, or call or message particular individuals such as a mother or father.

Figure 6:
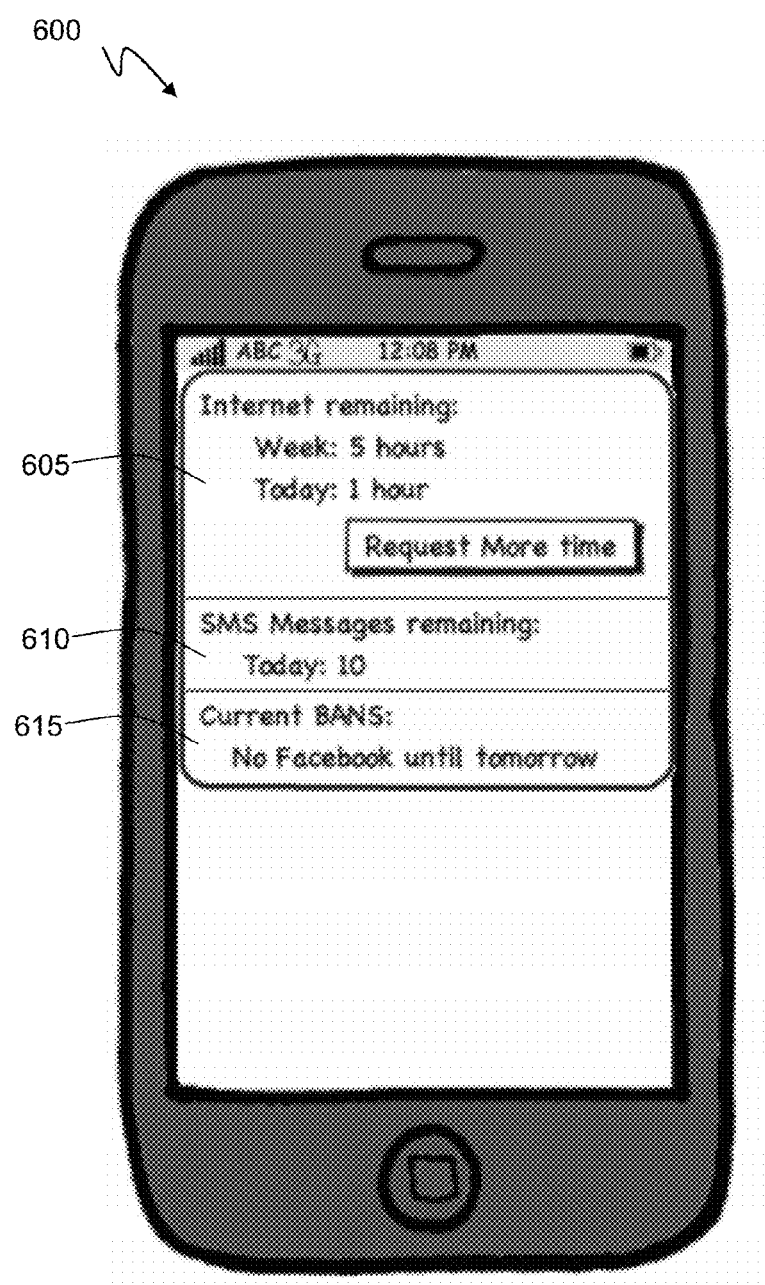
FIG. 6 illustrates a user view of the access control system of FIG. 1.

FIG. 6 illustrates a user status view 600 of the access control system 100.

The user status view 600 includes time usage status 605 and unit usage status 610. Time usage status 605 may include how much time is left for a device or a group of devices for a usage period or multiple usage periods. Unit usage status 610 includes how many units are left for a device, such as a device 110a-c, or multiple devices. Units may include text messages, emails, pages on a printer, etc.

The user status view 600 includes a ban overview 615 detailing any bans applicable to the user. The ban overview 615 may include the device or devices a ban is applicable to, and the time when the ban expires.

The user status view 600 includes a request button where a user may request more time for a time based limit, or more units for a unit based limit. The request for time or units is sent to a moderator for approval.

Figure 7:
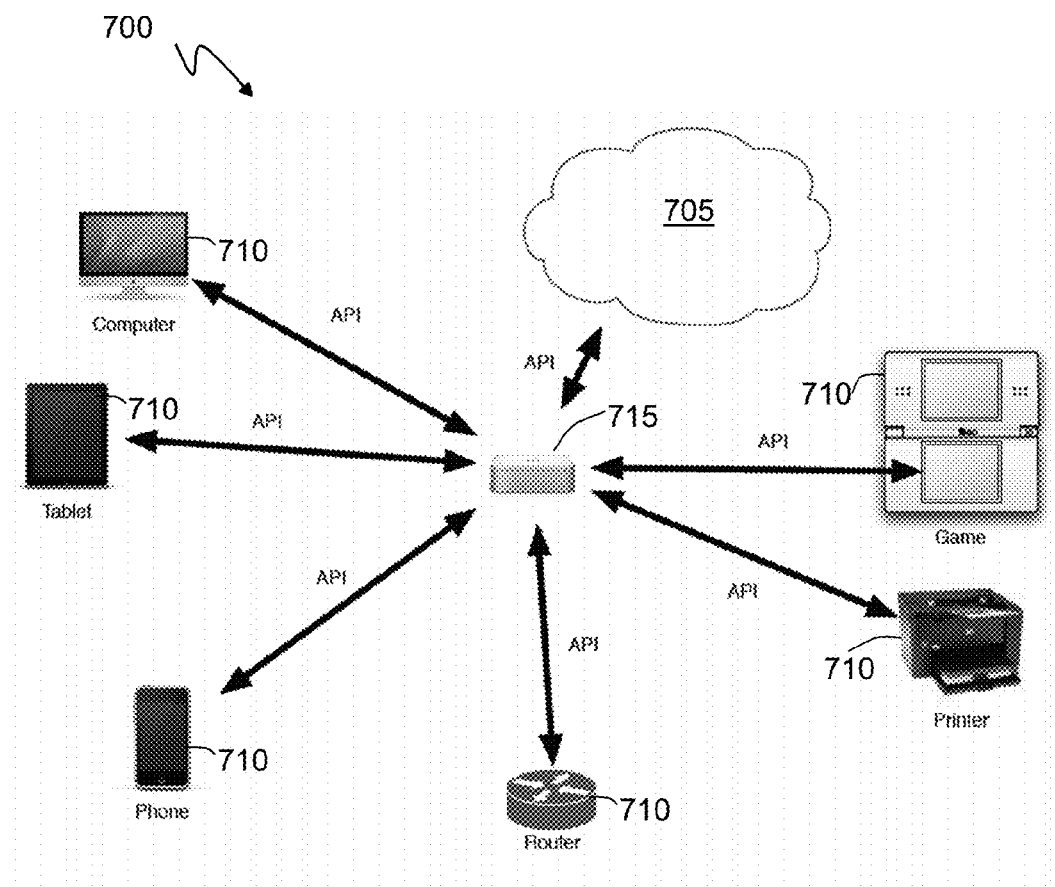
FIG. 7 illustrates an access control system including a plurality of devices, according to another embodiment of the invention.

FIG. 7 illustrates an access control system 700 including a plurality of devices 710, according to another embodiment of the invention.

The access control system 700 is similar to the access control system 100, and includes a centralized access control server 705 and the plurality of devices 710.

The access control system 700 additionally includes a local server 715. The local server 715 acts as a proxy between the plurality of devices 710 and the centralized access control server 705. The local server 715 reduces data traffic exiting, for example, a home network. Preferably, the local server 715 is embedded in a router or other consumer product.

Figure 8:
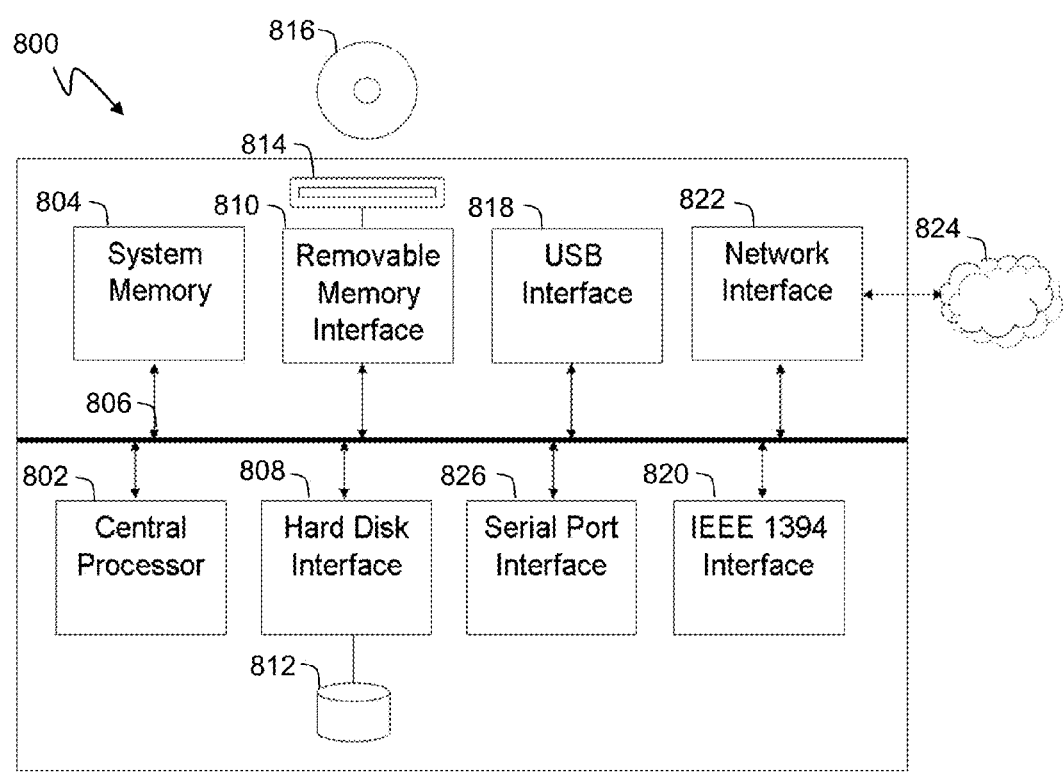
FIG. 8 illustrates a computer system with which the centralized server of FIG. 1 or FIG. 7 may be implemented.

FIG. 8 illustrates a computer system 800, with which the centralized server 105 of the present invention may be implemented.

The computer system 800 includes a central processor 802, a system memory 804 and a system bus 806 that couples various system components, including coupling the system memory 804 to the central processor 802. The system bus 806 may be any of several types of bus structures including a memory bus or memory controller, a peripheral bus, and a local bus using any of a variety of bus architectures. The structure of system memory 804 is well known to those skilled in the art and may include a basic input/output system (BIOS) stored in a read only memory (ROM) and one or more program modules such as operating systems, application programs and program data stored in random access memory. (RAM).

The computer system 800 may also include a variety of interface units and drives for reading and writing data. In particular, the computer system 800 includes a hard disk interface 808 and a removable memory interface 810, respectively coupling a hard disk drive 812 and a removable memory drive 814 to the system bus 806. Examples of removable memory drives 814 include magnetic disk drives and optical disk drives. The drives and their associated computer-readable media, such as a Digital Versatile Disc (DVD) 816 provide non-volatile storage of computer readable instructions, data structures, program modules and other data for the computer system 800. A single hard disk drive 812 and a single removable memory drive 814 are shown for illustration purposes only and with the understanding that the computer system 800 may include several similar drives. Furthermore, the computer system 800 may include drives for interfacing with other types of computer readable media.

The computer system 800 may include additional interfaces for connecting devices to the system bus 806. FIG. 8 shows a universal serial bus (USB) interface 818 which may be used to couple a device to the system bus 806. For example, an IEEE 1394 interface 820 may be used to couple additional devices to the computer system 800.

The computer system 800 can operate in a networked environment using logical connections to one or more remote computers or other devices, such as a server, a router, a network personal computer, a peer device or other common network node, a wireless telephone or wireless personal digital assistant. The computer 800 includes a network interface 822 that couples the system bus 806 to a local area network (LAN) 824. Networking environments are commonplace in offices, enterprise-wide computer networks and home computer systems.

A wide area network (WAN), such as the Internet, can also be accessed by the computer system 800, for example via a modem unit connected to a serial port interface 826 or via the LAN 824.

It will be appreciated that the network connections shown, and described are exemplary and other ways of establishing a communications link between the computers can be used. The existence of any of various well-known protocols, such as TCP/IP, Frame Relay, Ethernet, FTP, HTTP and the like, is presumed, and the computer system 800 can be operated in a client-server configuration to permit a user to retrieve web pages from a web-based server. Furthermore, any of various conventional web browsers can be used to display and manipulate data on web pages.

The operation of the computer system 800 can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

Figure 9:
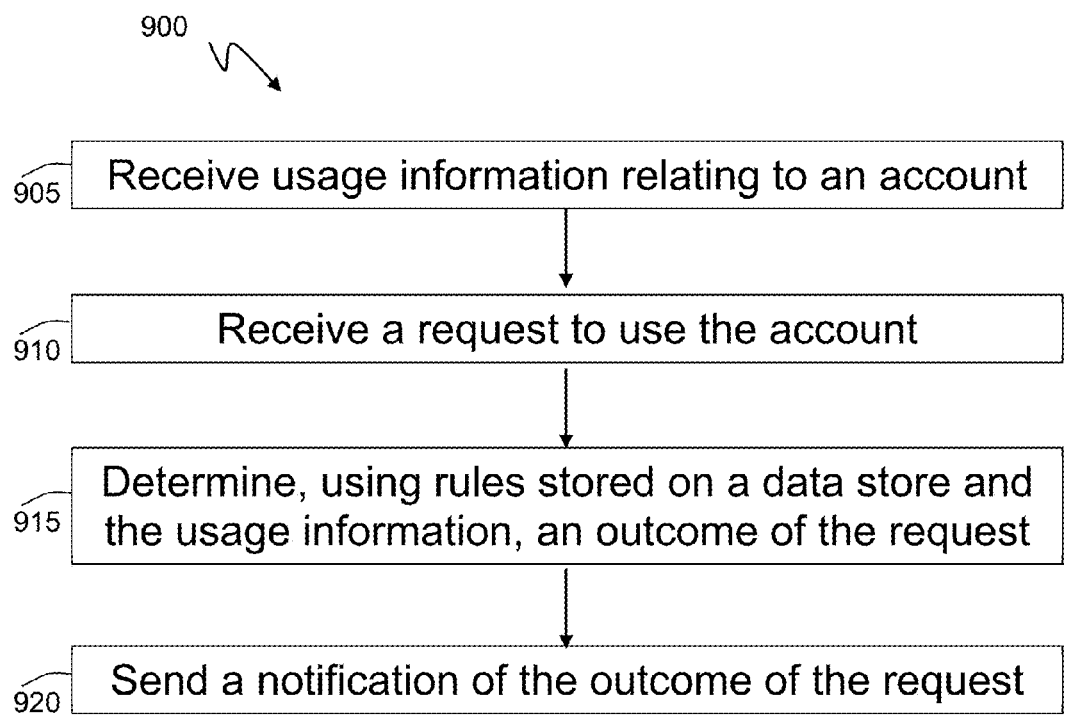
FIG. 9 illustrates a method of providing access control and usage monitoring of a plurality of electronic devices by a centralized server, according to an embodiment of the present invention.

FIG. 9 illustrates a method 900 of providing access control and usage monitoring of a plurality of electronic devices by a centralized server, according to an embodiment of the present invention.

At step 905, the centralised server receives usage information relating to an account. The account is associated with one or more electronic devices or applications. The account may comprise a social networking account, for example, which resides on a plurality of electronic devices on the Internet. Alternatively, the account may be associated with a local device and a user of the local device.

At step 910, a request to use the account is received from a user. The request may comprise for example a time request or a unit request. A time request may comprise a request to use a device for a certain period of time, for example. A unit request may comprise, for example, a request to send a text message or a request to print a page on a printer.

At step 915, an outcome of the request is determined, using rules stored on a data store and the usage information.

At step 920, notification of the outcome of the request is sent to the one or more electronic devices. The one or more electronic devices may then grant or deny access to the devices based upon this notification.

In summary, advantages of some embodiments of the present invention include an ability to efficiently provide access control to a plurality of devices and/or accounts. By applying rules and usage information across the plurality of devices and/or accounts, convenient and centralised control, such as by parents, can be achieved. According to some embodiments, rules can be easily structured to achieve usage rewards, incentives, or punishments associated with chores or other daily activities.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A system for providing access control and usage monitoring of a plurality of electronic devices or applications, including:
   a control server including:
      a reception interface, for receiving usage information relating to an account and a request to use the account, wherein each request includes an account identifier, and the account is associated with one or more of the plurality of electronic devices or applications and at least one user;
      a data store, including a first set of usage rules based on day types for the account and a second set of usage rules based on day types for a second account;
      wherein usage rules based on day types automatically assign a plurality of predetermined rules to a given calendar day based on a day type designated for the given calendar day, and wherein a day type designated for the given calendar day can be overridden by designating an alternative day type to the given calendar day;
      a processor and memory including program code, for:
         determining, using the rules stored on the data store associated with the account identifier in combination with the usage information, an outcome of the request; and
      a transmission interface, for communicating the outcome of the request, wherein the outcome is for controlling access to one or more of the plurality of electronic devices or applications by the at least one user.

2. The system of claim 1, wherein the rules include at least one of a time of day based restriction, a time based limit and a resource based limit.

3. The system of claim 1, wherein the rules include at least one rule that applies to more than one of the plurality of devices.

4. The system of claim 1, wherein the account identifier comprises a combination of a user identifier, identifying a user of one or more of the plurality of electronic devices or applications, and a device identifier, identifying one or more of the plurality of electronic devices or applications.

5. The system of claim 1, wherein the plurality of electronic devices or applications include at least one of a television, a personal computer, a printer, a router, a games console, a telephone, a micro-blogging application, and a social networking application.

6. The system of claim 1, wherein the rules include a plurality of rules applicable to the account identifier, wherein each rule is individually assessed.

7. The system of claim 1, wherein the rules include total usage bans for an account.

8. The system of claim 1, wherein the control server includes a reporting module that generates a report including usage statistics.

9. The system of claim 1, wherein the day types include at least one of a weekday, a weekend, a school day, a school night, a school holiday, a public holiday and a sick day.

10. The system of claim 1, wherein the control server includes an administration interface, which enables addition or deletion of rules and setting of day types.

11. The system of claim 1, wherein the rules may be modified through tokens, and where the tokens may be redeemed for a change in a rule.

12. The system of claim 11, wherein the change in the rule is adapted to encourage usage of a first device over usage of a second device.

13. The system of claim 11, wherein the system comprises an online shop for redeeming vouchers or tokens.

* * * * *